United States Patent
Boudan et al.

(10) Patent No.: US 6,282,105 B1
(45) Date of Patent: Aug. 28, 2001

(54) POWER SUPPLY SYSTEM FOR A GROUP OF LAMPS

(76) Inventors: Jacques Emile Boudan, 15 rue Bernard Aton, F-30000 Nimes; Jacques Froidefond, 37, Avenue Picasso, Domaine de Calais, F-13480 Cabries, both of (FR)

(*) Notice: Subject to any disclaimer, the term of this patent is extended or adjusted under 35 U.S.C. 154(b) by 0 days.

(21) Appl. No.: 09/381,893
(22) PCT Filed: Mar. 26, 1998
(86) PCT No.: PCT/FR98/00617
  § 371 Date: Sep. 23, 1999
  § 102(e) Date: Sep. 23, 1999
(87) PCT Pub. No.: WO98/44764
  PCT Pub. Date: Oct. 8, 1998

(30) Foreign Application Priority Data
Mar. 27, 1997 (FR) .................................. 97 04023

(51) Int. Cl.⁷ .............................. H02M 5/45; G05F 1/00
(52) U.S. Cl. ............................................ 363/37; 315/307
(58) Field of Search ............................. 363/34, 37, 95, 363/97, 131; 315/306, 307, 308, DIG. 4, DIG. 5, DIG. 7

(56) References Cited

U.S. PATENT DOCUMENTS

| 4,277,728 | 7/1981 | Carlile . | |
|---|---|---|---|
| 4,630,005 | 12/1986 | Clegg et al. . | |
| 4,723,098 | * 2/1988 | Grubbs | 315/306 |
| 4,873,471 | * 10/1989 | Dean et al. | 315/308 |
| 5,030,892 | * 7/1991 | Clegg | 315/277 R |
| 5,923,128 | * 7/1999 | Canova | 315/291 |

FOREIGN PATENT DOCUMENTS

| WO 91 00643 | 1/1991 | (DE) . |
| WO 93 21683 | 10/1993 | (DE) . |
| WO 94 27419 A | 11/1994 | (DE) . |
| 195 02 772 | 8/1996 | (DE) . |
| 0 516 122 | 12/1992 | (EP) . |

OTHER PUBLICATIONS

Schmidt O. R: "Quasai Resonant AC/DC Forward Converter with Sinusoidal Input Current"—Proceedings of the International Telecommunications Conference—Oct. 30—Nov.94, No. Conf. 16, Oct. 30, 1994, pp. 345–350.

* cited by examiner

Primary Examiner—Matthew Nguyen
(74) Attorney, Agent, or Firm—Herbert Dubno (57) ABSTRACT

A system for powering a group of lamps based upon need and avoiding waste caused by network voltage variations. A central unit is located at a connection point with the power network. The system comprises the central unit which receives a sinusoidal current in phase to power the line supplying the group of lamps via a direct voltage source and a generator located proximal to each lamp and supplying a medium frequency current thereto.

10 Claims, 7 Drawing Sheets

FIG.10 ary application 97/04023 in France filed Mar. 27, 1997 under the International Convention.

POWER SUPPLY SYSTEM FOR A GROUP OF LAMPS

CROSS REFERENCE TO RELATED APPLICATIONS

This application is a national stage of PCT FR 98/00617 filed Mar. 26, 1998 and based upon a national application 97/04023 in France filed Mar. 27, 1997 under the International Convention.

FIELD OF THE INVENTION

The sent invention concerns a device and method for powering discharge lamps of a public lighting network.

BACKGROUND OF THE INVENTION

The technical sector of the invention concerns the field of power supply methods and devices for powering public lighting networks.

The discharge lamps used for public lighting are conventionally powered by an electrical distribution network through inductive resistors called ballasts. The illumination and power of these lamps are strongly affected by the voltage of the electrical distribution network. Moreover, an unsatisfactory correlation is noted between the needs for high-degree illumination in the evenings when traffic is at its busiest and when energy consumption is at its peak. The network voltage is therefore at its lowest point and the lighting level is at its lowest.

At night during the "low-consumption hours", the network voltage regains its high limit and thus corresponds with the conventional devices used for public lighting at a maximum lighting level when the traffic, the satisfactory lighting of local residents and energy saving involve a reduced lighting level. This results in a significant waste of electric energy.

On the other hand, it is now admitted that the frequency (50 or 60 hertz) of the electric distribution network is too low to ensure maintaining ionization of the electric arc of lamps and which is therefore interrupted and reignited twice per period, namely 100 (or 120) times per second. Reignition is obtained by a voltage peak which provokes ageing of the lamps when the lighting oscillations generate a stroboscopic effect, that is a source of visual fatigue. By feeding the electric arc with a frequency current greater than 5 kilohertz, these drawbacks are eliminated and the lifetime of the lamp is significantly lengthened.

The patent application FR 2,542,152 describes a method and device for powering discharge lamps with frequencies of about 800 hertz to 150 kilohertz by a pseudo-square, trapezoid or square signal delivered by a generator which can be fed with DC by a mounting shown on FIGS. 6 and 7 of this document. Said mounting comprises:

a diode bridge connected to the network supply,
a self-inductive resistor connected to this single polar source by a reversing switch controlled by a control circuit fixing the period of the sequence cycle and the conduction time. The energy stored in the self-inductive resistor is discharged into the output capacitors by passing through a diode. Control of the switching transistor is carried out by a mounting comprising an oscillator, a single vibrator and control transistors. A transistor connected to a circuit equipped with Zenner diodes acts on the conduction time of the switch according to the output voltage and regulates the output voltage so as to compensate the fluctuations of variations of the charge of the network supply voltage.

This type of AC-DC converter, which is equipped with automatic control regulating the output voltage, has various drawbacks, and in particular owing to the complexity of the automatic control circuits for obtaining a steady, precise and reliable operation and linked with the difficulty to satisfy the standardizing constraints seeking to limit the radiated electromagnetic waves or feeders.

The U.S. Pat. No. 4,630,005 describes an AC-DC converter feeding several AC-DC converters (forming a type of electronic ballast) which each feed one or several discharge lamps. The AC-DC converter consists of a simple mounting of diodes adapted for a three-phase input voltage and to output delivery an AC voltage on three wires.

The U.S. Pat. No. 4,277,728 describes (FIGS. 1 and 2a) a supply system similar to the one described in the Patent FR 2,542,152. The embodiment of the AC-DC converter shown on FIG. 2b of this document uses a transformer whose primary is connected in series to a switching transistor, at the output of a diode bridge equipped with a filter. The output voltage is regulated by changing either the cyclic ratio or the switching frequency. The output voltage, filtered from the harmonic 2 of the network frequency, is used to modify the frequency of the control circuit of the switch so as to keep a constant output voltage. The devices described in this document are adapted to feed a single lamp requiring a weak power, namely several tens of watts.

SUMMARY OF THE INVENTION

The object of the present invention concerns a method and device for feeding a group of several discharge lamps which are improved, as well as a public lighting network implementing this method and device.

One object of the invention is to provide a simple reliable inexpensive device able to feed a distribution network with a D.C. current from an alternative network for public lighting and an improved method for feeding a public lighting network.

One object of the invention is to put right the drawbacks of systems generally used for feeding discharge lamps used in public lighting.

According to a first characteristic, the invention consists of providing a system for feeding a group of discharge lamps of a lighting network which comprises:

a device (called "central unit") situated at the connection point of the alternative energy network taking from a network a sinusoidal and in phase current feeding the feed line of the group of lamps by a continuous voltage source galvanically isolated from the network and supplying (injecting) the group of lamps with a fixed power able to be adjusted according to several reference variables, and devices (called "generators") situated close to each lamp and providing the lamps with a current of medium frequency, that is a frequency of generally between 5 kilohertz and 100 kilohertz and in particular between 15 and 20 kilohertz.

In other words, the invention consists of feeding a group of lamps situated downstream from a connection point at the energy network by a central unit which galvanically isolates it from the network and transmits a DC voltage to the generators associated with the lamps independent of fluctuations of the network and able to vary according to a power reference variable. The central unit takes from the network a sinusoidal current in phase with a low harmonic rate. The generators provide the lamps with a "hypersonic" frequency periodic electric signal which significantly increases the lifetime of the lamps.

According to another characteristic, the invention consists of providing a DC feeding device from an AC source in intended, in particular for feeding a large number of discharge lamps of a public lighting system, with a power of several hundreds or thousands of watts and comprising:

a diode bridge at least one rectified voltage—DC voltage converter fed by the diode bridge which is a transformer converter, whose output is galvanically isolated from the input and which does not have an automatic control for the output voltage.

The invention is based on the combination of:

the use of a transformer converter (generally known as "fly-back" converter), and an automatic control of the delivered (or "injected") power to the primary of the transformer, excluding any output automatic control, and a galvanic isolation between the input and output of the converter.

The use of a "fly-back" converter for powers generally less than or equal to 1 kilowatt runs counter to a presumption generally admitted according to which this type of converter is only to be used for applications requiring only some tens of kilowatts owing to the fact that when the power increases, the stray inductance of the transformer limits its use or because the output of this type of converter is affected by this stray.

The absence of adjustment of the output D.C. voltage of the converter shall also go against a generally admitted prejudgment according to which it is necessary to adjust this voltage for avoiding energy waste caused by variations of the network voltage. However, users of the system carrying out voltage adjustments have had experience in modifying the group-points of the regulator from time to time so as to compensate the degree of loss of lighting caused in particular by the loss of power absorbed by the lamp during its ageing. Injection of a power fixed by control points eliminates this factor.

The invention provides many advantages.

The absence of any automatic control system loop of the output DC voltage of the converter makes it possible to simplify the latter, thus reducing cost and improving operational reliability. This characteristic moreover contributes in the possibility of placing in parallel several AC-DC converters whose outputs can be connected to a common potential and which can be adjusted, independently or not, without interfering with each other and without causing operational instability. This placing in parallel favour obtaining a cheap high-power AC-DC converter able to feed many dozens of generators feeding the discharge lamps.

This facility of placing in parallel also results from the galvanic isolation between the input and output of the converter, said isolation partly resulting from the structure of the "fly-back" converter.

The galvanic isolation moreover makes it possible to connect the outputs of the converter on any type of network feeding the group of discharge lamps for public lighting.

By means of this galvanic isolation and if the structure of the network so allows, which is the case especially with networks conforming to current standards, the output DC voltage can be distributed with respect to the earth by means of a dividing mounting provided on the first stage and connected during placing. The maximum voltages are therefore +100 volts and −100 volts, close to the degrees of safety. The reaction time of the protection devices provided by the standards is therefore ten times longer than the one corresponding to a (200 volts) normal voltage of the network (0.1 seconds instead of 0.01 seconds).

Moreover, it is easy to connect the input of the three (preferably identical) converters feeding the same group of lamps to an (upstream) three-phase AC network which makes it possible to balance the power consumed per phase.

According to another significant characteristic, a permanent control is carried out to ensure that closing of the switch is effected at "zero switching", that is following full "draining" of the inductive energy stored in the magnetic circuit of the transformer during the preceding switching period.

By operating at a constant period and constant current-carrying time, the average current extracted during a period T is proportional to the instantaneous voltage of the network. This results in obtaining self-inductance properties by supposing a zero switching. The sinusoidal and in phase sampling is thus obtained without necessarily having an automatic control.

Apart from the fact that is simplifies the device, the suppression of the deviation amplification required with "boost" type mountings, such as those described in the document FR. 2,542,152, radically changes the safety conditions by suppressing the risks of hooking. It becomes possible to use an input low pass filer with two cells, much more effective than a one cell filter.

Zero switching means assumes the complete draining of the inductive energy stored in the magnetic circuit. With this condition, and the constant conduction time to, the energy sampling with each working period only depends on the square of the voltage u of the network: if the working voltage of the upstream network is constant, the injected power is proportional to the working frequency.

With distortion of the sinusoid of the network remaining in its acceptable limits, the relation between the equalized peak value and the effective value is virtually a constant square root of two. This peak value is seized to modulate the conduction time so that $$tc\ Ueff = tc\ max\ Ueff.\ min$$

Injected into the group of lamps is a power independent of the upstream network voltage which varies according to the switching period T which is used as a reference variable. This programmable "power injection" is carried out without any automatic control.

By means of this operating mode, the downstream does not react on the upstream which authorizes the placing in parallel of the outputs of several central units without any power limitation and from various sources of energy.

Zero switching requires that the stored energy be fully transferred on each cycle. This state can be easily checked, the secondary voltage suddenly being inverted at the end of draining the energy of the magnetic circuit, to this effect, an optical coupler (FIG. 10) is used fitted with adequate protection elements and connected between the terminals of the output diode. The role of this device is to prohibit conduction as long as the energy has not been drained in the use circuit.

According to another mounting, an optical coupler fitted with adequate protective elements can be mounted in parallel on the rectifier diodes mounted in series, for example three diodes in series.

Figure 6:
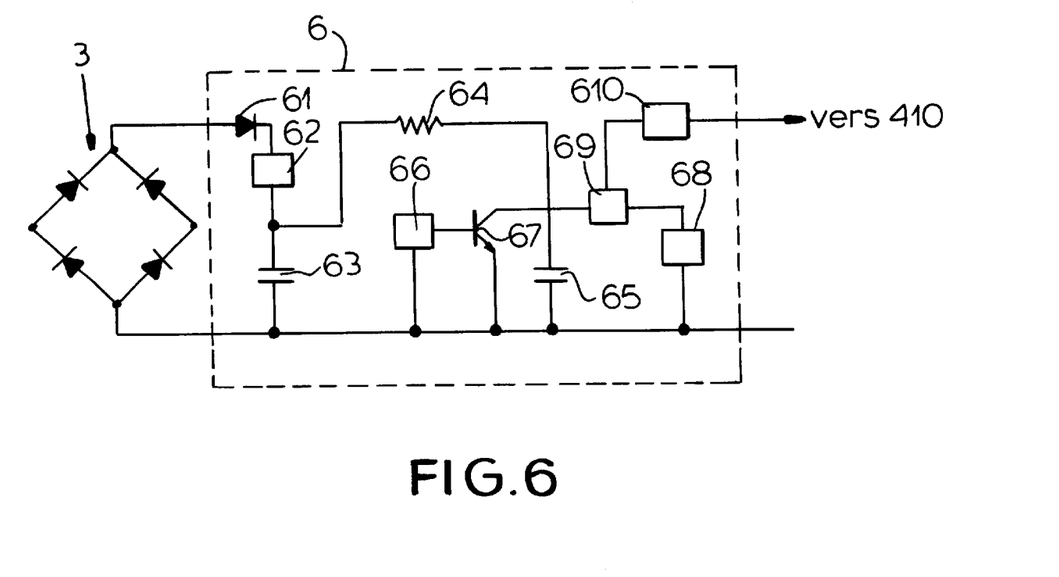
FIG. 6 describes a simplified embodiment of the voltage compensating mounting.

According to other preferred embodiments of the device of the invention:

the device can comprise several rectified voltage converters with identical DC. voltage which can be fed by a common diode bridge and whose outputs are connected in parallel, in particular, the device can comprise one to four and in particular three diode bridges, and one to twelve and especially three, six or nine converters whose outputs are connected in parallel so as to be used by being fed, for example, by an alternative three-phase network, said rectified voltage converter with a DC voltage comprises a circuit or an output voltage monitoring circuit or circuit arm (FIG. 9) which comprises a Zenner diode connected in series with a threshold adjustment potentiometer and with the input (and/or the transmitter) of a transducer (or transmitter) whose input is galvanically isolated from the output. The transducer is preferably constituted by an optocoupler. Said circuit or circuit arm is connected to the output terminals of the converter, the threshold voltage of this circuit being slightly more (about 1 to 25% and especially between 5 and 15%) than the normal output voltage of the converter. The output of the transducer, preferably constituted by the receiver of an optocoupler, is connected to the circuit for adjusting the switching frequency of the converter so as to reduce the average power delivered at the output of the converter when the output voltage exceeds a value able to vary during the start up phase for several minutes and predetermined in an established operation, said transducer or optocoupler accordingly being normally inoperative, the secondary of the transformer is connected to a diode (or to several series diodes), a circuit (or circuit arm) being connected to the terminals of the diode(s) so as to control zero switching of the switch of the converter. The zero switching control circuit comprises to input of the transducer whose output is galvanically isolated from the input and preferably comprises the emitter of an optocoupler whose receiver (output of the transducer) is connected to the switching control circuit of the switch so as to only authorize control circuit of the switch so as to only authorize closing of the switch after cancellation of the current coming out of the secondary of the transformer, the converter comprises a circuit for controlling switching of the switch (FIG. 8) which comprises means ("clock" means) to adjust the switching frequency of the switch according to a power reference variable to be delivered at the output by keeping constant a conduction time of the switch. The frequency (and/or clock) adjustment means preferably comprise a DC voltage source, several reference voltages representing power reference variables, a current source proportional to the voltage representing the power reference variable, a capacitor, a diac and a constant period timing circuit, the circuit comprises a circuit for compensating the AC voltage variations of the network feeding the bridge which comprises (FIG. 6), a simple mounting detecting a value Ua close to the peak voltage and whose value is sufficiently representative of the working voltage Uc within the limits of tolerated variations of distortion of the sinusoid so that Ua=k Uc;

the observed variation of k being compatible with the sought-after precision in the correction operation: these conditions are fulfilled with a filtering whose charge time constant is slightly less than 10 milliseconds (for example between 6 and 10 milliseconds) for a 50 hertz network or even slightly less than 12 milliseconds for a 60 hertz network and whose discharge time constant is slightly less than 250 milliseconds, for example between 300 and 250 milliseconds (by way of example if FIG. 6: R62=2.2 kohm, C63=4.4 microfarads, R64=68 kohm);

an RC circuit whose capacitor is periodically discharged on each clock cycle, a reference voltage, a comparator able to reduce the power reference variable, said converter preferably further comprises:

an input filter for protection against voltage waves, an anti-rejection lowpass input filter, these filters being placed upstream of the diode bridge.

Connected to the positive output of the diode bridge at a point common with the input of the primary of the transformer(s) is the reference of a circuit for recovering the stray energy of the magnetic circuit of the main transformer (s) whose secondary disposed at the output with a diode is connected at the output of the converter.

According to another characteristic, the invention consists of providing a system or feed network of a plurality of discharge lamps for public lighting which comprises a device conforming to the invention and a transport network for continuously feeding by said device a plurality of DC.-AC. converters (generators) which each feeds a discharge lamp under an alternative voltage whose frequency is preferably between 10 to 20 kilohertz and especially close to 15 kilohertz. Said transport network may comprise two wires insulated with respect to neutral and/or earth and be equipped with differential protection means.

According to another characteristic, the invention consists of implementing a method for feeding a plurality of discharge lamps of a public lighting network, each lamp being associated with DC-AC. converter or generator in which network:

a converter device according to the invention is selected whose power is adapted to the power normally consumed by the lamps and their associated generators, the input of said device is connected to an electric network providing an alternative, mono-, bi-, or three-phase voltage source, for example under a voltage of 230 volts and a frequency of 50 hertz, the generators associated with the lamps are connected in parallel to the output of the device by DC current transport network preferably comprising two insulated wires, one or several power reference variables are adjusted corresponding to the power normally consumed by the plurality of lamps according to one or several predetermined lighting modes, the generators are preferably fed by a DC voltage whose potentials with respect to the earth have a neighboring value and opposite sign, and if required:

during start up, the power absorbed by the generators of the group of non-energized lamps is extremely low and increases slowly by stages at the time of successive start ups and then progressively during the placing into operation period which may reach 20 minutes until the fixed power is reached. During this phase, the power reference variable is limited by the circuit form monitoring the output voltage since when the power has reached a sufficient value, said circuits ceases its activity. Secondly, in the exceptional case where on of several lamps are destroyed or a portion of the network is cut, the remaining group of lamps operating cannot absorb the fixed power and the output voltage monitoring circuit resumes its power limitation function until a return to the initial state.

This function occurs immediately if a fault appears not enabline the group of lamps to absorb the power fixed by the adjustment when the line voltage reaches the threshold fixed by the monitoring circuit.

When subsequent to a data error the nominal power of the group of lamps exceeds the maximum power of the selected DC-AC. converter, the apparent resistance of the group of generators viewed from the DC. voltage source coming out of the converter does not permit discharging the magnetic energy on each switching period, the zero switching control circuit reduces the injected power. This abnormal state triggers an alarm signal and the programmed lighting cannot be attained.

In the case of an accidental short-circuit in a circuit connecting the generator to its lamp or in a lamp, the frequency of the generator increases and the power required on line becomes extremely weak, functioning being similar to that described earlier.

In the case of an accidental short-circuit on the line between the converter and the generators, the zero switching control circuit suspends functioning of the switches putting the converter on stand-by until the fault disappears. The same circuit prohibits start up on any short-circuit.

BRIEF DESCRIPTION OF THE DRAWING

The advantages of the invention shall be more readily understood on a reading of the following non-restrictive description of the preferred embodiments of the invention with reference to the accompanying drawings.

In the drawings, unless specified otherwise, identical or similar elements bear the same references from one figure to another.

Figure 3:
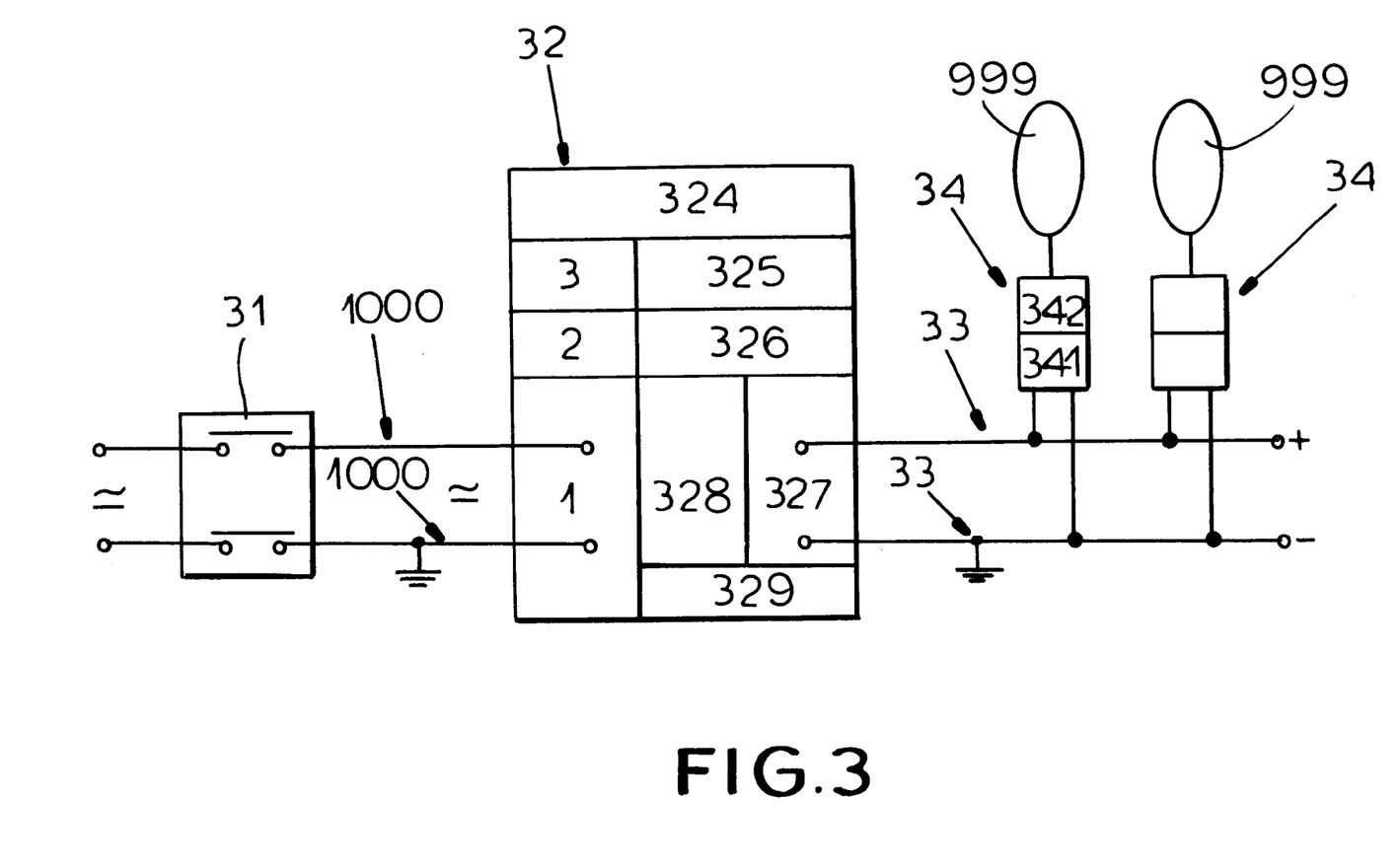
FIG. 3 shows in functional block diagram form the main functions of a central unit according to the invention and its use for the DC feeding of a public lighting network.

With reference to FIG. 3, the central unit 32 whose input is connected to the alternative network by means of a control box 31 includes the following modules: a module 1 for protection against shock waves, a working frequency filter 2, a rectifier 3, an active filter 324 for taking sinusoidal current in phase, a progressive starting module 325, a device 326 for galvanically isolating the output circuit, a power adjustment and storage device 327, a line cut-off and short-circuit protection device 328, and a clock device 329.

The output 33 of the central unit serves the feed line of the group of generators, each generator 34 feeding a lamp 999 including an oscillator 341 and a starter 342.

Functioning is as follows: the line 33 (or downstream DC network) is fed with DC. voltage by a source galvanically isolated from the upstream AC network 1000. The earth load can be freely fixed so as to provide the best possible safety. According to the time program fixed by the time device 329, the lamps function according to one of three preprogrammed power reference variables in the block 327.

The currents rejected by the generators 34 in the line 33 are internal to the downstream DC network. They only comply with the standards for the radiated disturbances. The ramp relaxation oscillators used in the generators 34 are slightly radiating and known precuations provide conformity with the standards. The embodiment of the generators is thus particularly simple and reliable.

Figure 4:
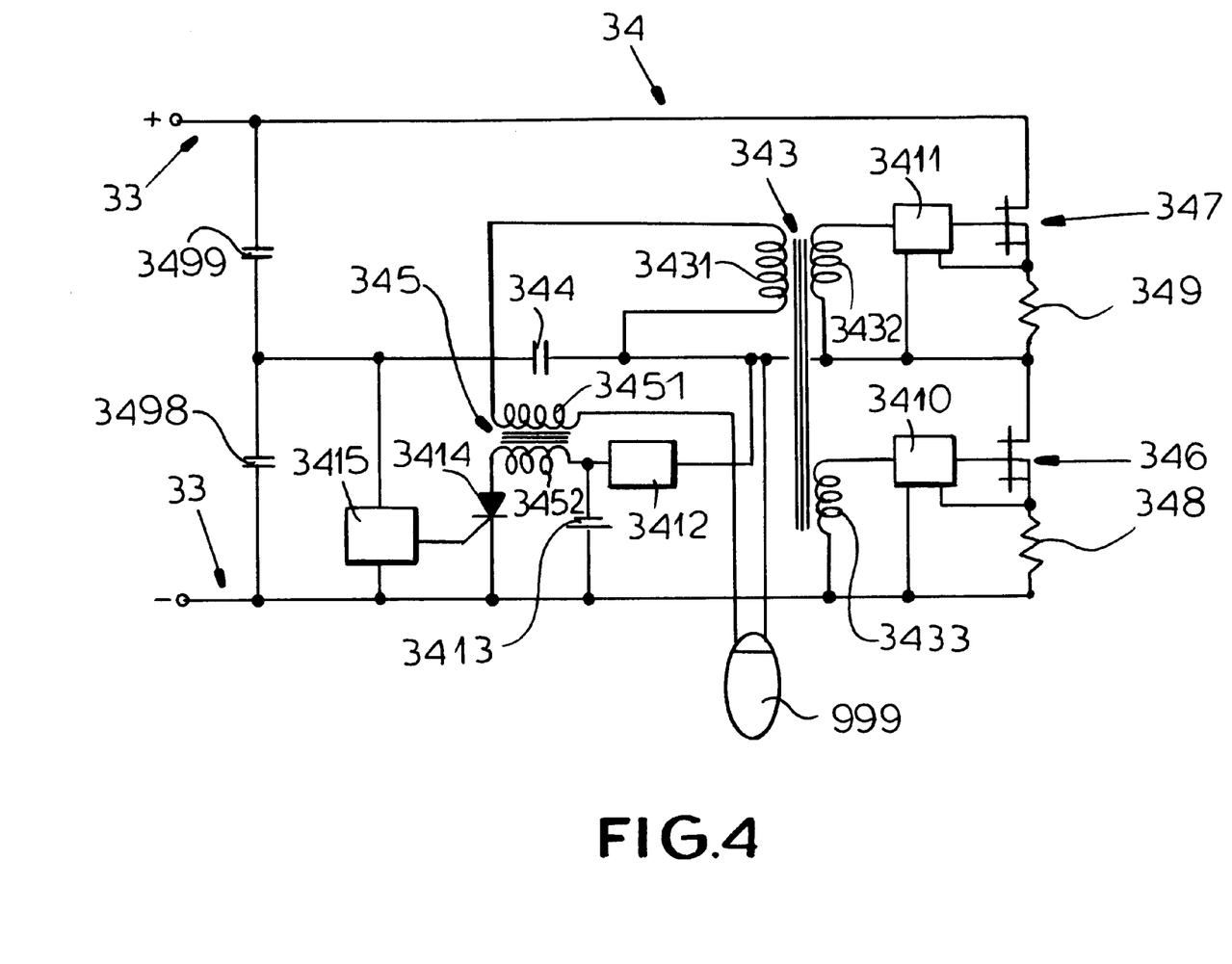
FIG. 4 is a simplified diagram of a generator associated with a discharge lamp for it to be fed from a direct current produced by the central unit.

FIG. 4 gives by way of example a simplified diagram of a generator 34.

3498 and 3499 are capacitors.

343 is a primary transformer 3431 and comprising two secondaries 3432 and 3433.

344 is a ramp capacitor.

345 is an auxiliary winding self-inductive resistor.

346 and 347 are switches.

348 and 349 are intensity measuring resistors.

3410 and 3411 are current threshold circuits.

3412 is a voltage multiplier.

3413 is a high voltage capacitor.

3414 is a thyristor.

3415 is a time base.

With high diffusion components (IGBT switches and ferrite transformers), the nominal power of an elementary converter can be 500 effective watts. By virtue of its modular structure, the central unit can deliver an output of 1.5 kW, 3 kW, 6 kW.

The user chooses the central unit and the size before installation according to the nominal power absorbed by the group of lamps. The maximum power can be adjusted within a range of up to 16% by steps of 1%.

The functioning of the oscillator is that of a series push-pull relaxation oscillator providing a trapezoidal symmetrical signal. The current threshold circuits 3410 and 3411 alternatively lock the switches 346 and 347, thus deciding on the oscillation frequency. Fed by a "hypersonic" (generally between 10 and 100 kilohertz) frequency signal, the circuit of the arc of the lamp 999 behaves in an established state load like a resistor whose value depends on the power. The state of the arc is thermally unstable. The stability of the circuit is reestablished by the impedance of the inductance. Secondly, the light output of the lamp depends on the shape of the voltage signal applied to the arc. Thus, there is an optimum relationship connecting the feed voltage of the oscillator and the value of the current thresholds. This relationship is obtained by determining the values of an impedance bridge situated in each current threshold circuit 3410 and 3411 so as to obtain stability of operation and improved light output in the range of powers used. By means of this device, the value of the voltage of the line 33 determines the power absorbed by the lamp and ensure distribution of the power provided by the central unit between the various generators 34 fed by the central unit.

The functioning of the igniter is as follows: during start, the multiplier 3412 charges the capacitor 3413.

The thyristor 3414 discharges the capacitor 3413 through the auxiliary winding 3452 of the self-inductive resistor provoking a high voltage pulse at the terminals of the lamp.

Figure 5:
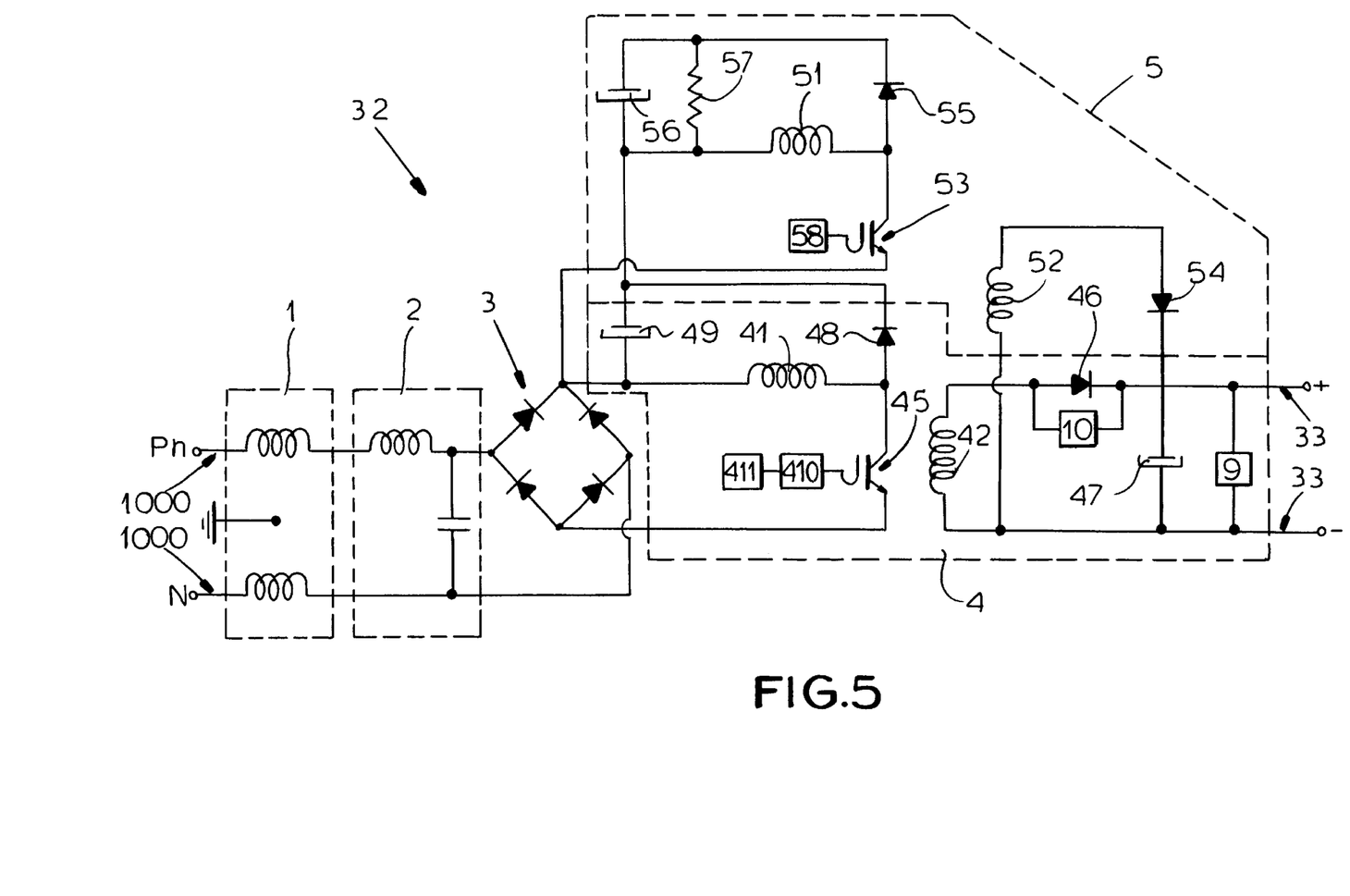
FIG. 5 is a simplified diagram of the main currents of the central unit.

With reference to FIG. 5, the central unit 32 responds to the previously defined characteristics of galvanic isolation between the energy network 1000 and the line 33 feeding the lamps and the supply of a DC. voltage independent of the voltage of the upstream network and able to vary (floating) according to the power reference variable of the central unit and the charge.

The described mountings make it possible to simply and reliably obtain a sinusoidal current sampling in phase with the voltage satisfying the standardizing conditions concerning the current harmonics. These advantages are obtained by taking account of the specific characters of use: nominal power defined during installation—no-load start—progressive power rise—slow transitions between the states.

FIG. 5 shows a simplified diagram of the main circuits of the central unit 32 which comprises a filter 1 for protection against shock waves (overvoltages of the upstream network) of a known type, a lowpass filter 2 stopping the rejection of average frequency currents towards the upstream network, a diode rectifier bridge 3, a main current 4 of the "fly-back" converter which comprises:

The primary 41 of an air gap transformer which for a secondary 62 has a power switch 34, a fast diode 46, a storage capacitor 47, a fast diode 48 and a capacitor 49. 410 is a functional block controlling the switch 45 and 411 is a functional block fixing the power reference variable.

An auxiliary circuit 5 known as a stray recovery circuit of the same type as the circuit 4 comprises:

The primary 51 of an air gap transformer which for a secondary 62 has a power switch 53, fast diodes 54 and 55, a storage capacitor 56, a dissipation resistor 57, and a functional block 58 controlling the switch 53.

The primary 41 of the air gap transformer is connected to the positive pole of a rectifier bridge and to a switch 45 rendered periodically conducting for a constant period $T_{he}$. A secondary circuit is constituted by the secondary 42 connected to a capacitor 47 through a diode 46. The parametric elements of the circuit are calculated so that the passage on conduction of the switch 45 is made with zero switching in the entire power range used.

Functioning is as follows: the self inductance of the primary 41 and the transformation ratio of the windings 41 and 42 are calculated so that in the entire power range used the switch 45 moves on conduction with a zero current.

In this condition, known as "zero switching", the average current $i_h$ on a period at the mounting switching frequency, close for example to 15 kilohertz, is given by the formula:

$$i_h = \frac{1}{2} \frac{ut_c}{<} \frac{t_c}{T} \qquad 1)$$

In this formula:

$I_h$ is the average current on the clock period T.

u is the instantaneous value of the voltage of the network.

L is the self-inductance of the primary 41.

$T_c$ is the conduction duration of the switch 45.

T is the time period of the functional block 410.

The action of the low-pass filter 2 provides an instantaneous current I taken from the network virtually equal to the average value $i_h$ of the current during the clock period.

The formula 1) shows that, if the periods $t_c$ and T are constant, the instantaneous current of the network is proportional to the instantaneous voltage:

$$i = \frac{u}{R} \text{ with} \qquad 2)$$

$$R = \frac{2LT}{t_c^2} \qquad 3)$$

Viewed from the network, the regulator behaves like a resistor, does not generate any current harmonics and providing a power factor equal to the unit, the phase shift introduced by the two-stage low-pass filter being low. Secondly, the energy taken during the conduction time is transmitted to the losses close to the secondary circuit. Thus, the device imposes an instantaneous power independent of the downstream conditions as long as the zero switching condition is observed.

The instantaneous power is given by the formula:

$$w = \frac{1}{2} \frac{u^2}{L} \frac{t^2 c}{T} \qquad 4)$$

If the voltage of the network is sinudoidal, the average power is:

$$w = \frac{1}{2} \frac{u^2}{L} \frac{t^2 c}{T} \qquad 5)$$

V being the effective voltage or the network.

FIG. 6 describes a simplified embodiment of the voltage compensator mounting 6 included in the functional block 410 which ensures an average power independent of the variations of the upstream network when establishing the equation $$V^2 t_c^2 - K^2, \text{ K being a constant.} \qquad 6)$$

The circuit 6 of FIG. 6 comprises:

a diode 61, a 2.2 Knhm current equalizer 62, a 4.4 microfarad filtering capacitor 63 between the output terminals of the rectifier 3, a high value resistor 64, for example 68 KΩ, a low value capacitor, for example 20 nF, a discharge circuit 6 of the capacitor 63 activated during the second phase of the clock, a discharge transistor 67, a voltage reference 68 of several volts, a comparator circuit 69 prohibiting conduction when the voltage of the capacitor 63 reaches the reference 68, a circuit 610 authorizing conduction of the switch 45.

Operation takes place as follows: the diode 61 and the current equalizer 62 charge the capacitor 63 to a value close to the peak of the voltage signal of the upstream network which is a satisfactory image of the output effective value V of the voltage of the upstream network within the practical limits of distortion of the voltage signal of the network.

The capacitor 65 is discharged at each clock period. The charging time $t_{ch}$ of the capacitor 65 with the value defined by the reference 68 is inversely proportional to the voltage of the capacitor 63, thus to the value V of the effective voltage of the upstream network:

$$t_{ch} = K/v \qquad 7)$$

The switch 45 is controlled during the charging time tch of the capacitor 65.

The equation 7 is only applicable in the range of maximum variations of the network voltage of more or less than 10%, namely from 207 to 253 volts for a nominal voltage of 230 volts. Less than 207 effective volts, namely 292 peak volts, $t_{ch}$ is limited to the value $t_{emax}=t_u$ fixed by the clock and the power decreases.

In the above range, the conduction time $t_c$ is equal to $t_{ch}$:

$$t_c = t_{ch} \text{ the following equation is obtained:} \qquad 8)$$

$$t_c = K/v \text{ an equation equivalent to equation 6.} \qquad 9)$$

The equation 5 shows that the average power provided by the mountings depends on an inverse function of the clock period T.

Figure 1:
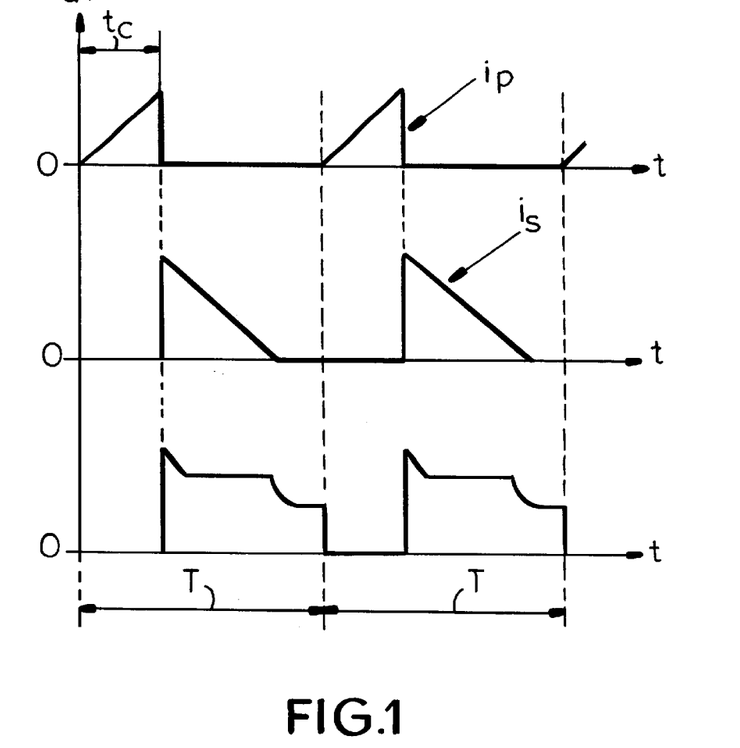
FIG. 1 drammatically shows a timing diagram of the intensity of the currents circulating in the primary and secondary of the transformer of the "fly-back" converter and the collecting voltage or switch transistor of this converter.
Figure 2:
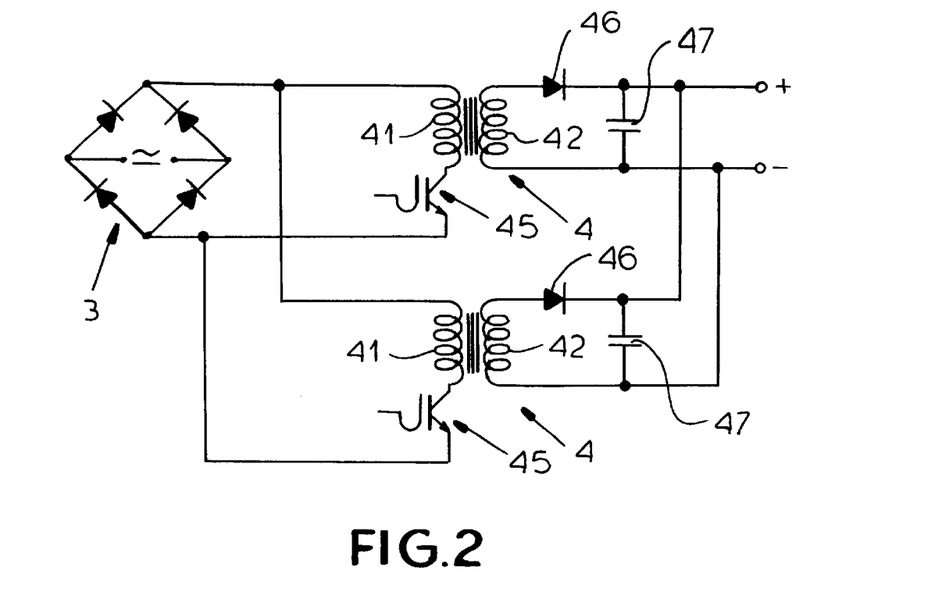
FIG. 2 diagrammatically shows an AC-DC converter comprising a diode bridge and two DC./rectified voltage converters, whose outputs are connected in parallel.
Figure 7:
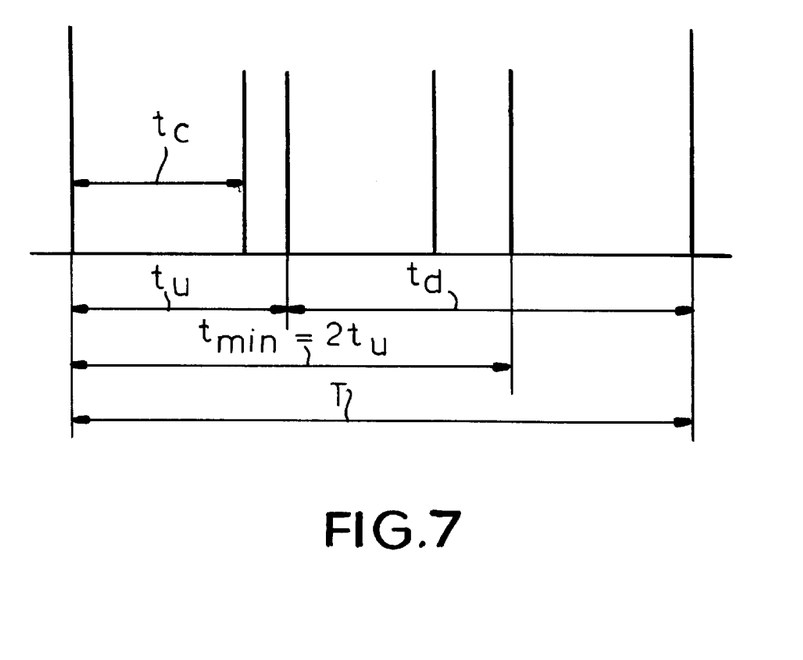
FIG. 7 illustrates the operating principle of the clock of the central unit.
Figure 8:
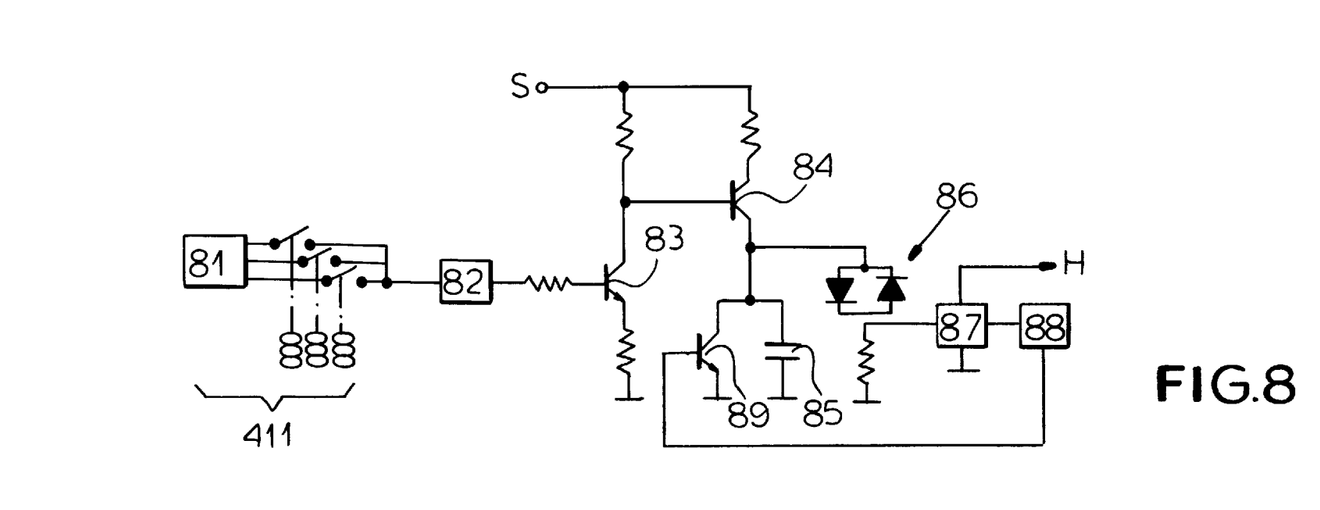
FIG. 8 describes a simple reliable device constituting the clock of the functional block 410 making it possible to introduce the power reference variable.

FIGS. 1, 7 and 8 in particular, show a method and its device enabling the central unit to provide in a simple and reliable manner a power fixed by a reference variable.

The clock period comprises two phases shown on the diagram of FIG. 7 on which:

$t_u$ is a time of constant period during which operation of the switch of the FIG. 5 is authorized $t_d$ is a variable time depending on the power reference variable.

The switching period T is the sum of these two periods:

$$T = t_u + t_d \qquad 10)$$

The period T, is the maximum limit of the value of the switching (or conduction of the switch 45) time $t_c$. It imposes a minimum value Umin of the effective voltage for which the equation 6) is ensured.

This voltage corresponds for example to the network voltage minus 10%. Below this voltage value, the transmitted power decreases.

The control circuit of the switch at zero switching limits the operational power in the case of any voltage reduction affecting the safety of the mounting.

When the network voltage is above Umin, the central unit must be able to provide the corresponding power to the maximum reference variable. Owing to the mounting of the voltage compensator described above, the energy sampled at each period from the network shall be constant.

The emptying time $t_v$ of this energy in the secondary circuit is given by the formula:

$$t_o = t_c \frac{(n_1)}{(n_2)} 2 \frac{u}{U_s} \qquad 11)$$

In this formula:

$t_v$ is the emptying time, $t_c$ is the conduction time, $n_1$ is the number of spires of the primary 51, $n_2$ is the number of spires of the secondary 52.

u is the instantaneous value of the network voltage, $U_s$ is the output voltage of the central unit.

The maximum value of $t_v$ is obtained when u reaches its peak value. To obtain the maximum output of the technological components of the mounting, it will be proper to establish the equation:

$$t_{vmax} = t_c \qquad 12)$$

By starting in the equation 11, the following is obtained $$\frac{(n_1)^2}{(n_2)} \frac{V \sqrt{2}}{U_s} \qquad 13)$$

V being the effective value of the network nominal voltage.

As the equation 12) must be observed in whole range of fixed voltage, it seems that, in order to observe the zero switching condition, the minimum period of the clock must be:

$$T_{min} = 2 t_u \qquad 14)$$

FIG. 8 describes a safe and simple device constituting the clock of the functional block 410 making possible to introduce the power by variation of the clock frequency.

The circuit of FIG. 8 comprises:

a D.C. voltage source 5 of about 40 volts, a mounting 81 providing several stabilized voltages in the order of 4 to 12 volts representing the power reference variables, a time constant 82 time delaying the voltage variation over several minutes, a mounting 83, 84 transforming the voltage into a current of several milliamperes.

84 is a source mounting of a current $i_c$, a linear function of the reference variable, with a nominal value of about 20 milliamperes. 85 is a low value capacitor of for example 20 nF. 86 is a diac having an avalanche threshold of about 30 volts. 87 is a constant duration timing circuit $tu_2$, of for example 30 microseconds. 88 is a reversing switch mounting. 89 is a transistor discharging the capacitor 85. H is the signal of the clock of the functional block 410.

Functioning is as follows: the capacitor 85 is charged by the current originating from the mounting 34 until its voltage reaches the threshold of the diac 86. The pulse of the diac triggers the timing circuit 87.

The constant duration $t_u$ of this dwell time is a time interval during which switching is authorized. During this period, the capacitor 85 is discharged and kept in this state. The charge time of the capacitor 85 until the threshold of the diac is a time $t_d$ inversely proportional to the current $I_2$ derived from the source S.

One advantage of this type of clock including a diac oscillator is its immunity to electromagnetic disturbances (parasites) resulting from the functioning of the switches.

In operating the system according to the invention described in FIG. 3, the smooth starting device 325 and the clock device 329 modify the period T so as to provide the reference variable power during the transition states and according to the programmed time slices. The duration (about one minute) of the transition states is extremely long before the period (20 milliseconds) of the upstream network so that the hypothesis made from the constancy of $t_c$ and T is sufficiently observed.

In certain circumstances, for example an incident occurring to the lamp of the group, the power imposed cannot be absorbed. The secondary voltage defines an output voltage threshold in the transition starting state and in the established state. A mounting 9 shown on FIGS. 9 and 5 monitors the output voltage and makes it possible to modify the injected power reference variable so as to continue operation until the original situation is restored.

Figure 9:
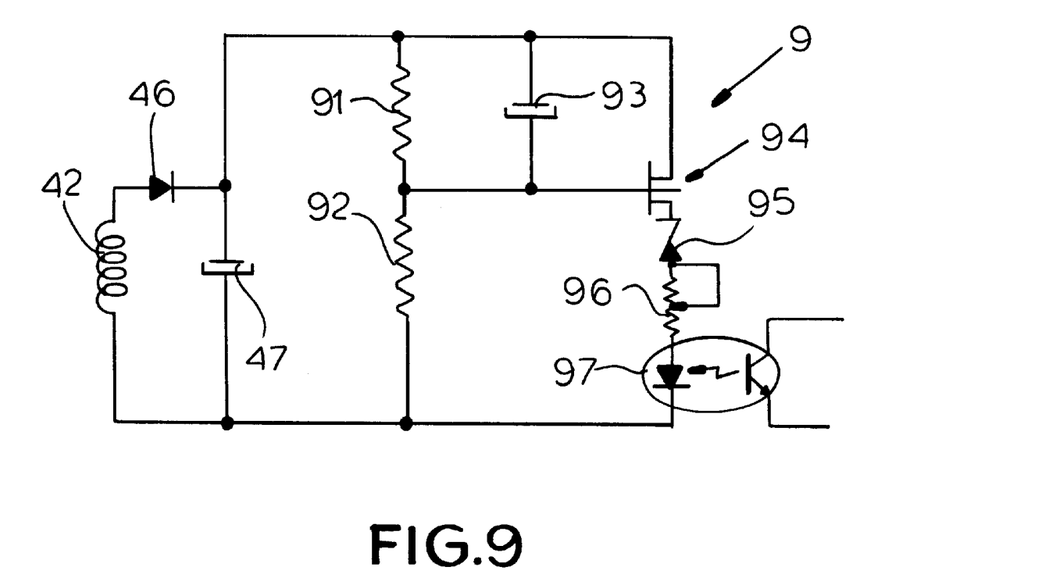
FIG. 9 illustrates a circuit for measuring and limiting the DC output voltage of the converter (central unit).

In FIG. 9:

91 and 92 are high value resistors, for example 1 megaohm. 93 is a high value high voltage capacitor, such as 470 microfarads. 94 is a MOSFET transistor. 95 is a Zenner diode of 120 volts. 96 is a threshold adjustment potentiometer and 97 is an optical coupler.

Functioning is as follows: in the starting transition state, the conduction threshold of the Zenner diode is reached as soon as the output voltage exceeds the nominal value and the power reference variable increases slowly.

When the operational power is reached, the level of the threshold continues to increase and the optocoupler is no longer on conduction.

If the fixed power cannot be consumed on account of a defect, the threshold voltage is reached and the coupler 97 transmits a signal for reducing the reference variable. This mounting ensures stable functioning and permits idling.

In other circumstances, especially if there is an accidental short-circuit in the line feeding the group of lamps, the "zero switching" condition is no longer fulfilled. The operating of the system shall be interrupted until the defect disappears. A mounting 10 shown on FIGS. 10 and 5 ensures the safety of the system by only authorizing switching of the switch 45 of FIG. 5 if the "zero switching" condition has been previously fulfilled.

Figure 10:
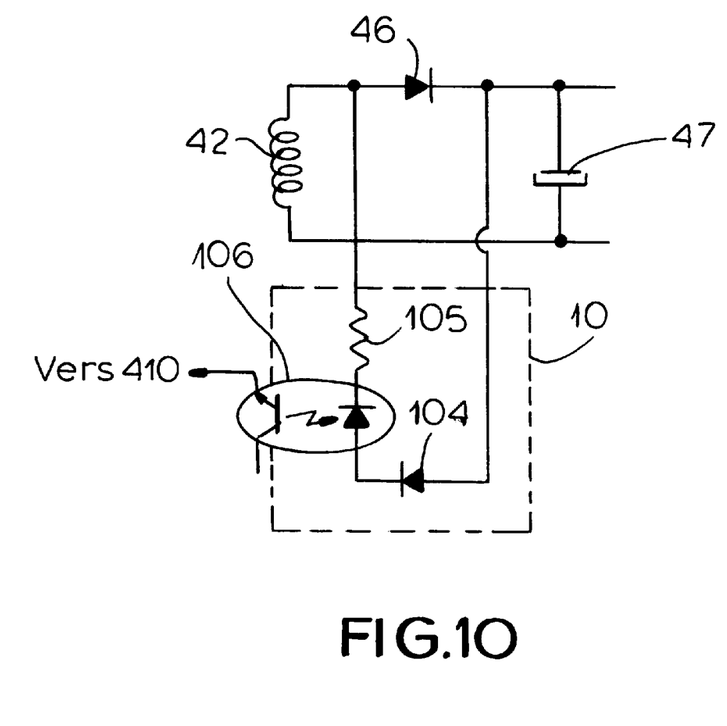
FIG. 10 illustrates a detection circuit for cancelling the circit circulating in the secondary of the transformer of the central unit and its use for authorizing conduction of the switch of the central unit.

The circuit 10 on FIG. 10 comprises a high voltage diode 104, a resistor 105 of about 100 k$\Omega$, and an optoelectronic coupler 106.

Functioning is as follows: as long as the zero switching condition has not been fulfilled, the coupler 106 does not authorize conduction.

If the condition is fulfilled before the end of the second phase t of the clock period, functioning is normal and the conduction time $t_c$ is fully used.

If the condition is not fulfilled during the first phase, the switch remains locked during the period.

If the condition is fulfilled during the first phase of the clock period, conduction takes place until the end of this first phase. Accordingly, the conduction time is reduced, as well as the power injected into the circuit until the zero switching condition has been restored. The mounting thus permits up to certain limits to provide operation at a reduced power when the charge at the output temporarily or permanently exceeds the power corresponding to the reference variable.

During the switching time, one portion of the energy accumulates in the stray self-inductance of the transformer 41 and is then stored in the capacitor 49 of FIG. 5.

The average stray power is about 20% of the power transmitted from the primary to the secondary.

So as to increase output and avoid heating, it is advantageous to have this energy recovered by the auxiliary circuit 5 known as a "stray recovery circuit". The functioning of this circuit is based on the properties of the "fly-back" making it possible to transmit the energy of the DC voltage source, here the capacitor 49, to a galvanically isolated circuit, in this instance the output circuit of the converter.

Figure 11:
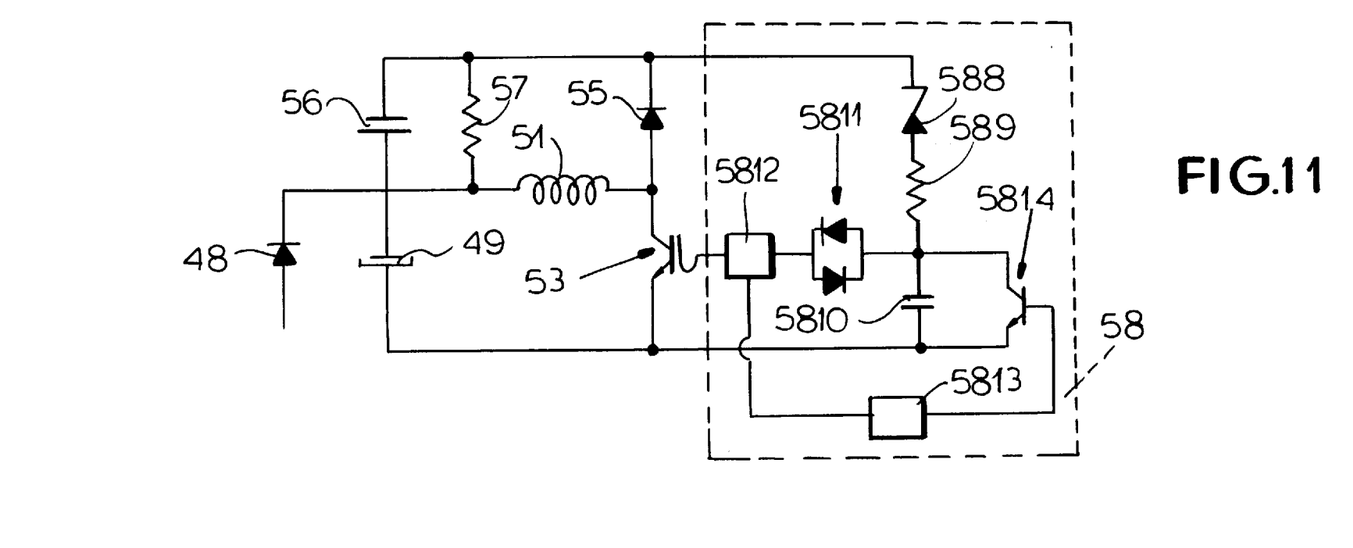
FIG.11 illustrates a stray recovery circuit integrated in the central unit.

The diagram of FIG. 11 represents the operational block 58:

588 is a Zenner diode (or a mounting of diodes) with a threshold of about 300 volts, 589 is a resistor of about 10 k$\Omega$, 5810 is a capacitor of about 10 nF, 5811 is a diac having an avalanche threshold of about 30 volts, 5812 is a dwell time of constant period tp, for example 30 us, 5813 is an inverter mounting, 5814 is a transistor discharging the capacitor 5810.

Functioning is as follows: when the voltage of the capacitor 49 exceeds 300 volts, the capacitor 5810 is charged, the diac 5811 triggers a fixed period strobe, the dwell time t of about 30 microseconds provoking the conduction of the switch 53 and the charging the inductive resistor 51 with energy.

During locking, most of the energy is transferred by the secondary 52 and the diode 54 of FIG. 5 into the capacitor 47. The stray energy of the "fly-back" of the recuperator charges the capacitor 56. The secondary stray power is dissipated in the resistor 57. It is about ten times smaller than the main stray. When the power of the stray of the main circuit 4 increases, the voltage of the capacitor 49 increases and increases the frequency of the strobes, thus increasing the power of the recovery circuit 5.

What is claimed is:

1. A device for feeding a group of discharge lamps connected to a lighting network from an AC distribution network, said circuit comprising at least one central unit having an input connected to said distribution network, and an output connected to said lighting network, a diode bridge connected to said input, and at least to a transformer converter which converts the rectified voltage generated by the bridge to a DC voltage applied to said lighting network while providing a galvanic isolation between said input and said output, said transformer converter comprising a primary circuit fed by said bridge and having a switching means controlled by a control unit so as to apply in a primary winding to the transformer a high-frequency AC current, and a secondary circuit comprising a secondary winding of the transformer which is connected to said output through a rectifier circuit, said control circuit comprising means for adjusting said frequency according to one of a plurality of reference values, each corresponding to a power to be delivered at said output, said windings being calculated so that in the entire range used, the switching means moves on conduction with a zero current and therefore, the transformer converter delivers on each switching cycle of the switching means a constant energy independent from a downstream condition of the lighting network.

2. Device according to claim 1 wherein each of said lamps is connected to said lighting network through a local generator comprising a DC/AC converter.

3. The device according to claim 1 which comprises several rectified voltage—DC voltage converters whose outputs are connected in parallel.

4. The device according to claim 1 in which said transformer converter comprises an output voltage monitoring circuit which comprises a Zenner diode series connected with the input of a transducer with galvanic isolation, said monitoring circuit being connected to an output terminal of said transformer converter, said transducer having an output which is connected to a control circuit of said switching means of said transformer converter.

5. The device according to claim 3 wherein said transformer converter comprises a secondary winding which is connected to a diode having terminals on which is connected a zero switching control circuit of said switching means, said switching control including an input of a galvanically isolated transducer having an output which is connected to the control circuit of said switching means.

6. The device according to claim 1 wherein said clock means comprises a DC voltage source, several reference voltages representing power reference variables, a current source providing a current proportional to a voltage representing one of said power reference variables, a capacitor, a diac and a timing circuit of constant duration.

7. The device according to claim 1 which comprises a circuit for compensating AC voltage variations of said AC distribution network, said compensating circuit comprising a diode, a resistor and a capacitor providing a DC voltage representing the effective voltage of said source, an RC circuit whose capacitor is periodically discharged by the clock of said transformer converter, a source with a reference voltage and a capacitor able to reduce the power reference variable.

8. The device according to claim 1 which comprises three diode bridges and three, six or nine converters whose outputs are connected in parallel.

9. The device according to claim 1 which comprises a circuit for recovering strays of the magnetic circuits of the main transformers, said circuit comprising a secondary transformer whose secondary disposed in series with a diode is connected at the output of the converter.

10. A system for feeding a plurality of discharge lamps for public lighting and which comprises:

a device according to claim 1 and a network for the DC feeding by said device a plurality of AC. converters which each feed a discharge lamp under an AC voltage.

* * * * *